United States Patent
Ji

(10) Patent No.: US 11,693,771 B2
(45) Date of Patent: Jul. 4, 2023

(54) STORAGE DEVICE FOR STORING RANDOMIZED DATA AND OPERATING METHOD OF THE SAME

(71) Applicant: SK hynix Inc., Icheon-si (KR)

(72) Inventor: Seung Gu Ji, Seoul (KR)

(73) Assignee: SK hynix Inc., Icheon-si (KR)

( * ) Notice: Subject to any disclaimer, the term of this patent is extended or adjusted under 35 U.S.C. 154(b) by 295 days.

(21) Appl. No.: 16/703,779

(22) Filed: Dec. 4, 2019

(65) Prior Publication Data

US 2020/0379905 A1 Dec. 3, 2020

(30) Foreign Application Priority Data

May 27, 2019 (KR) .................. 10-2019-0061906

(51) Int. Cl.
*G06F 12/02* (2006.01)

(52) U.S. Cl.
CPC .................. *G06F 12/0292* (2013.01)

(58) Field of Classification Search
None
See application file for complete search history.

(56) References Cited

U.S. PATENT DOCUMENTS

| | | | | |
|---|---|---|---|---|
| 8,898,377 | B2* | 11/2014 | Jeon | G11C 16/10 711/103 |
| 2010/0229001 | A1* | 9/2010 | Park | G11C 16/22 713/190 |
| 2010/0229007 | A1* | 9/2010 | Park | G11C 7/1006 713/193 |
| 2011/0119432 | A1* | 5/2011 | Yoon | G11C 7/1006 711/103 |
| 2012/0166714 | A1* | 6/2012 | Mun | G06F 12/0246 711/103 |
| 2012/0265928 | A1* | 10/2012 | Mun | G11C 16/10 711/103 |
| 2013/0124783 | A1* | 5/2013 | Yoon | G11C 16/26 711/103 |
| 2013/0163332 | A1* | 6/2013 | Cha | G11C 7/1006 365/185.12 |
| 2015/0095558 | A1* | 4/2015 | Kim | G11C 16/10 711/103 |
| 2016/0314842 | A1* | 10/2016 | Park | G11C 16/08 |

FOREIGN PATENT DOCUMENTS

| | | |
|---|---|---|
| KR | 10-2013-0060795 A | 6/2013 |
| KR | 10-1881089 B1 | 11/2013 |
| KR | 10-2017-0024529 A | 3/2017 |
| KR | 10-2017-0111386 A | 10/2017 |

* cited by examiner

*Primary Examiner* — Charles Rones
*Assistant Examiner* — Ryan Dare

(57) ABSTRACT

A storage device having enhanced operating efficiency includes a memory device with a plurality of memory blocks and a memory controller that performs an operation of de-randomizing data stored in different memory blocks using an identical random seed. The memory controller includes a random table that has a first address group including physical page addresses of a first memory block and a second address group including physical page addresses of a second memory block. The random table also has a random seed group that includes random seeds corresponding to the first address group and the second address group.

15 Claims, 16 Drawing Sheets

FIG. 5

PROGRAM SEQUENCE ↓

| WL | Program |
|---|---|
| WL1 | Foggy PROGRAM |
| WL2 | Foggy PROGRAM |
| WL1 | Fine PROGRAM |
| WL3 | Foggy PROGRAM |
| WL2 | Fine PROGRAM |
| WL4 | Foggy PROGRAM |
| ⋮ | ⋮ |
| WLN | Fine PROGRAM |
| WLN+2 | Foggy PROGRAM |
| WLN+1 | Fine PROGRAM |
| WLN+3 | Foggy PROGRAM |
| WLN+2 | Fine PROGRAM |
| ⋮ | ⋮ |

FIG. 10

| SLC ADDRESS | QLC ADDRESS | RANDOM SEED(SEED) |
|---|---|---|
| SWL1 | QWL1 | SQW1 |
| SWL2 | | |
| SWL3 | | |
| SWL4 | | |
| SWL5 | QWL2 | SQW2 |
| SWL6 | | |
| SWL7 | | |
| SWL8 | | |

STORAGE DEVICE FOR STORING RANDOMIZED DATA AND OPERATING METHOD OF THE SAME

CROSS-REFERENCE TO RELATED APPLICATION

The present application claims priority under 35 U.S.C. § 119(a) to Korean Patent Application Number 10-2019-0061906 filed on May 27, 2019 in the Korean Intellectual Property Office, the entire disclosure of which is incorporated herein by reference.

BACKGROUND

1. Technical Field

Various embodiments of the present disclosure relate to an electronic device, and more particularly, to a storage device and a method of operating the same.

2. Related Art

A storage device is a device configured to store data. The storage device may include a memory device configured to store data, and a memory controller configured to control the memory device. Semiconductor memory devices are memory devices using a semiconductor such as silicon (Si), germanium (Ge), gallium arsenide (GaAs), indium phosphide (InP), or the like. Memory devices are classified into volatile memory devices and nonvolatile memory devices.

Volatile memory devices are memory devices in which data stored therein is lost when power is interrupted. Representative examples of the volatile memory devices include a static RAM (SRAM), a dynamic RAM (DRAM), and a synchronous DRAM (SDRAM), as non-limiting examples. Nonvolatile memory devices are memory devices which retain data stored therein even when power is interrupted. Representative examples of the nonvolatile memory devices include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM), as non-limiting examples. Flash memories are classified into NOR types and NAND types.

SUMMARY

Various embodiments of the present disclosure are directed to a storage device having enhanced operating efficiency, and methods of operating the storage device.

An embodiment of the present disclosure may provide for a controller configured to control an operation of a memory device including a first memory block and a second memory block, comprising: a random table configured to include a first address group including addresses of memory cells included in the first memory block and a second address group including addresses of memory cells included in the second memory block and correspond to the respective addresses of the memory cells included in the first memory block, and a random seed group including random seeds corresponding to the respective addresses of the memory cells included in the second memory block; a random seed generator configured to output a selected random seed from among the random seeds included in the random seed group, based on an address in which write data is to be stored among the addresses included in the first address group or the second address group; and an operating component configured to generate the write data by randomizing, using the selected random seed and original data.

An embodiment of the present disclosure may provide for a storage device comprising: a memory device including a first memory block and a second memory block; and a controller configured to control the memory device, wherein the controller generates write data by randomizing data to be stored in the first memory block using a random seed that corresponds to the second memory block, and provides the write data to the memory device for storing in the first memory block.

An embodiment of the present disclosure may provide for a storage device comprising: a memory device including a plurality of memory blocks; and a memory controller configured to perform, using an identical random seed, at least one of operation of randomizing or de-randomizing; wherein the operation of randomizing data is an operation of generating data to be stored in different memory blocks among the plurality of memory blocks using original data and the identical random seed, wherein the operation of de-randomizing data is an operation of generating the original data using the identical random seed and the data stored in one of the different memory blocks.

An embodiment of the present disclosure may provide for a method of operating a controller configured to control a memory device including a plurality of memory blocks, the method comprising: receiving original data and a write request from a host; generating write data by randomizing the original data based on an address at which the original data is to be stored; and providing the write data to the memory device, wherein the generating the write data comprises: determining a random seed according to the address at which the original data is to be stored; and performing a randomization operation using the random seed, wherein the random seed corresponds in common to at least one or more addresses different from the address at which the original data is to be stored.

BRIEF DESCRIPTION OF THE DRAWINGS

FIG. 5 is a diagram illustrating a sequence in which a foggy-fine program operation is performed in a memory block in accordance with an embodiment of the present disclosure.

FIG. 10 is a diagram illustrating a random table 213 in accordance with an embodiment of the present disclosure.

DETAILED DESCRIPTION

Figure 1:
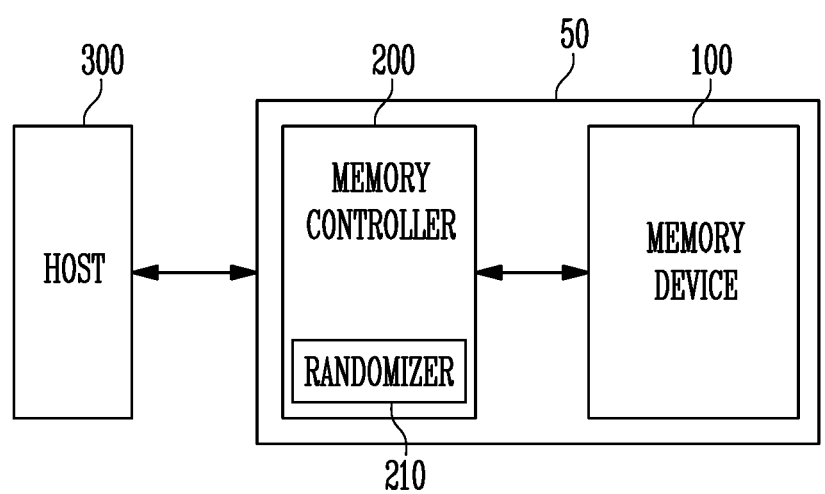
FIG. 1 is a diagram illustrating a storage device including a memory device in accordance with an embodiment of the present disclosure.

Specific structural or functional descriptions in the embodiments of the present disclosure introduced in this specification or application are only for the purpose of describing the embodiments of the present disclosure. The descriptions should not be construed as limiting embodiments contemplated by the disclosure to those described in the specification or application.

The present disclosure will now be described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

It will be understood that, although the terms "first", "second", etc. may be used herein to describe various elements, these elements are not be limited by these terms. These terms are only used to distinguish one element, from another element in this specification. For instance, a first element discussed below could be termed a second element without departing from the teachings of the present disclosure, and similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, parts, steps, operations, elements, components, and/or combinations of them but do not preclude the presence or addition of one or more other features, numbers, parts, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Detailed description of functions and structures well known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are shown, so that those of ordinary skill in the art can easily carry out the technical idea of the present disclosure.

FIG. 1 is a diagram illustrating a storage device 50 including a memory device 100 in accordance with an embodiment of the present disclosure.

Referring to FIG. 1, the storage device 50 may include the memory device 100 and a memory controller 200.

The storage device 50 may be a device configured to store data under the control of a host 300 such as a cellular phone, a smartphone, an MP3 player, a laptop computer, a desktop computer, a game machine, a TV, a tablet PC, or an in-vehicle infotainment system as non-limiting examples.

The storage device 50 may be implemented as any one of various kinds of storage devices depending on a host interface, which is a communication system with the host 300. For example, the storage device 50 may be configured of any one of various kinds of storage devices such as, for example, a solid state drive (SSD), a multimedia card (MMC), an embedded MMC (eMMC), a reduced size MMC (RS-MMC), or micro-MMC, a secure digital card (SD), a mini-SD, a micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any one of various package types. For instance, the storage device 50 may be manufactured as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory device 100 may store data therein. The memory device 100 may operate in response to or under the control of the memory controller 200. The memory device 100 may include a memory cell array 110 including a plurality of memory cells configured to store data. The memory cell array 110 may include a plurality of memory blocks. Each memory block may include a plurality of memory cells. Each memory block may be a unit for performing an operation of erasing data from the memory device 100. In an embodiment, a memory block may include a plurality of pages. Each page may be a unit for performing a program operation of storing data in the memory device 100 or an operation of reading the stored data from the memory device 100.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, for the sake of convenience, it is assumed that the memory device 100 is a NAND flash memory.

In an embodiment, the memory device 100 may be embodied in a three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

In an embodiment, each of the memory cells included in the memory device 100 may be in the form of any one of a single-level cell (SLC) capable of storing a single data bit, a multi-level cell (MLC) capable of storing two data bits, a triple-level cell (TLC) capable of storing three data bits, and a quad-level cell (QLC) capable of storing four data bits.

The memory controller 200 may control overall operations of the storage device 50. When power is applied to the storage device 50, the memory controller 200 may execute firmware (FW). For example, where the memory device 100 is a flash memory device, the memory controller 200 may execute firmware such as a flash translation layer (FTL) for controlling communication between the host 300 and the memory device 100.

If a write request is input from the host 300, then the memory controller 200 may receive from the host 300 data to be stored and a logical address (LA) for identifying the corresponding data. The memory controller 200 may translate the input logical address into a physical address (PA) indicating physical addresses of memory cells in which the data is to be stored among the memory cells included in the memory device 100. The memory controller 200 may provide, to the memory device 100, a program command for storing data, a translated physical address, and data to be stored.

In an embodiment, if a read request is input from the host 300, then the memory controller 200 may receive, from the host 300, a logical address for identifying data to be read. The memory controller 200 may obtain a physical address corresponding to the input logical address, and provide a read command and a physical address to the memory device 100. In embodiments, during an erase operation, the memory controller 200 may provide an erase command and a physical block address to the memory device 100.

In an embodiment, the memory controller 200 may autonomously control the memory device 100 to perform a program operation, a read operation, or an erase operation in the absence of a request from the host 300. For example, the memory controller 200 may control the memory device 100 to perform a background operation such as a wear leveling operation, a garbage collection operation, and a read reclaim operation.

The memory controller 200 may include a randomizer 210.

The randomizer 210 may perform a randomization operation for data to be stored in the memory device 100. The randomizer 210 may perform a de-randomization operation for data to be read from the memory device 100. The randomizer 210 may minimize iteration of the same bit value (0 or 1) for data to be stored in the memory device 100 and therefore mitigate a change in threshold voltage distribution of memory cells. The randomizer 210 has structures well-known to those skilled in this art, and therefore further detailed explanation of its structures will be omitted.

The randomizer 210 may perform a randomization operation during a program operation. For example, the randomizer 210 may generate a random seed based on a physical address that indicates positions of memory cells for storing data. The randomizer 210 may generate a random sequence (RS) using a random seed. The randomizer 210 may perform, using the generated random sequence (RS), a randomization operation for original data provided by the host 300. The randomized original data may be write data. The memory controller 200 may provide write data to the memory device 100. The memory device 100 may perform a program operation of storing write data in memory cells.

The randomizer 210 may perform a de-randomization operation during a read operation. The randomizer 210 may receive, from the memory device 100, read data which is data that has been read. The randomizer 210 may perform a de-randomization operation for the read data using a random sequence (RS) used during the randomization operation. The de-randomized data may be the original data provided from the host 300.

Copies of the same data may be stored in different memory cells included in the memory device 100. For example, copies of the same data may be stored in different memory blocks included in the memory device 100. In detail, the memory device 100 may store data in a first memory block and in another second memory block for backup so as to cope with a sudden power off event. The randomizer 210, however, generates a random seed according to a physical address in which data is to be stored. Hence, although data to be stored in different memory blocks is the same data, the data to be stored in the different memory blocks may be randomized using different random seeds. Therefore, to store data that is stored for backup in a specific memory block included in the memory device 100 after reading, the memory device 100 has to read data stored for backup and the randomizer 210 has to perform a de-randomization operation for the read data and recover the original data thereof. Then, the randomizer 210 may randomize the recovered original data using different random seeds and store the randomized data in the memory device 100. As such, if different random seeds are used to perform a randomization operation for the same original data and then store copies of the original data in different memory blocks, then applications that use the corresponding data may be limited.

In accordance with an embodiment of the present disclosure, if the same original data is stored in different memory blocks, then the randomizer 210 may perform a randomization operation using the same random seed. Therefore, there is no need to perform an operation of de-randomizing data for backup to recover the original data. Consequently, data applications using data in the memory device 100 may be facilitated.

The host 300 may communicate with the storage device 50 using at least one of various communication methods such as, for example, universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
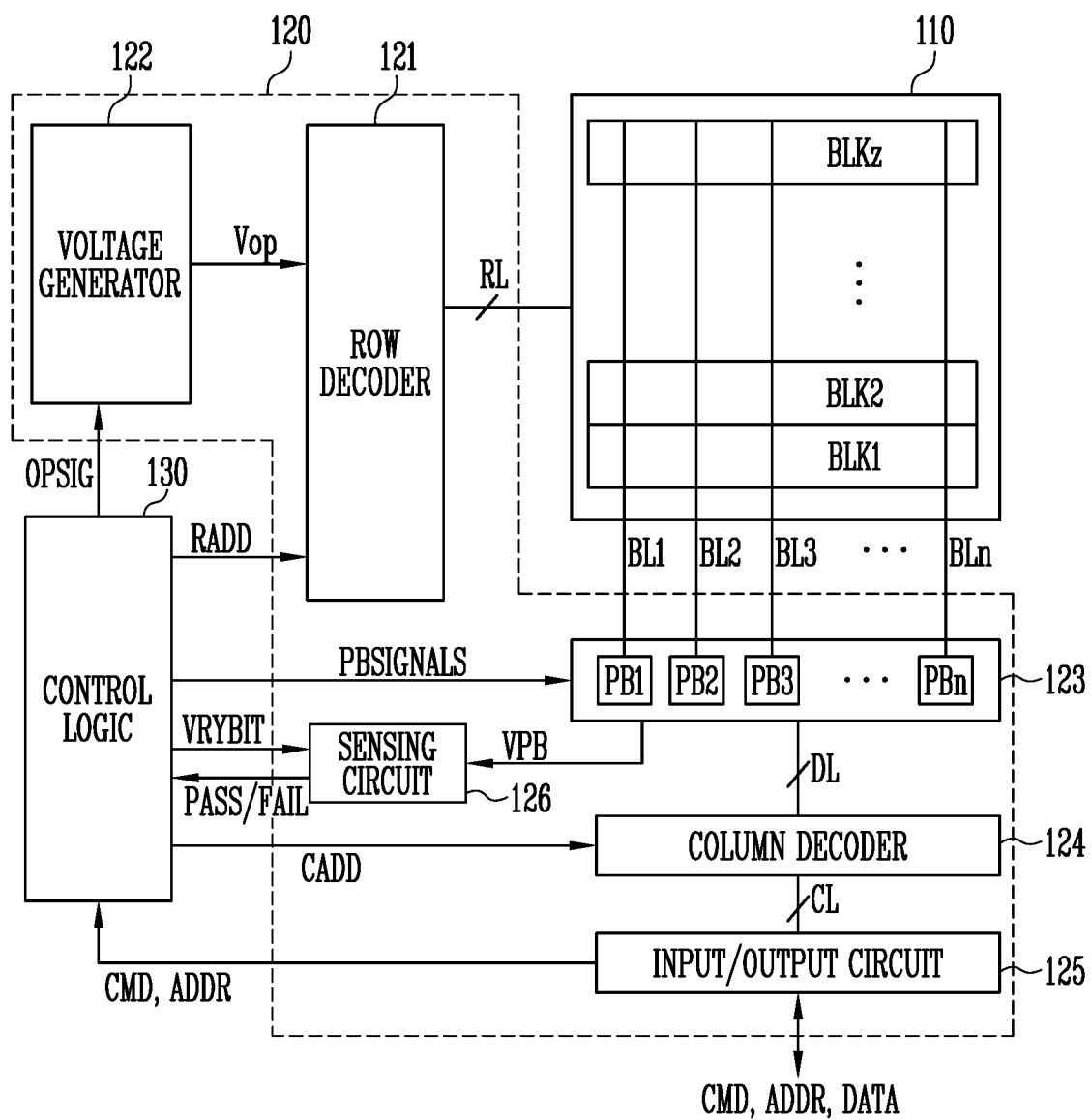
FIG. 2 is a diagram illustrating a structure of a memory device in accordance with an embodiment of the present disclosure.

FIG. 2 is a diagram illustrating a structure of the memory device 100 in accordance with an embodiment of the present disclosure.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to a row decoder 121 through row lines RL. The plurality of memory blocks BLK1 to BLKz may be coupled to a page buffer group 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line may be defined as one page. Hence, each memory block may include a plurality of pages.

The row lines RL may include at least one source select line, a plurality of word lines, and at least one drain select line.

Each of the memory cells included in the memory cell array 110 may be formed of a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row liens RL and the bit lines BL1 to BLn, or discharge the applied voltages under the control of the control logic 130.

The peripheral circuit 120 may include the row decoder 121, a voltage generator 122, the page buffer group 123, a column decoder 124, and an input/output circuit 125.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130.

The row decoder 121 may decode the row address RADD. The row decoder 121 may select at least one memory block of the memory blocks BLK1 to BLKz in response to the decoded address. The row decoder 121 may select at least one word line WL of the selected memory block in response to the decoded address so that voltages generated from the voltage generator 122 are applied to the at least one word line WL.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, an erase operation of the memory device 100 may be performed on a memory block basis. During an erase operation, the row decoder 121 may select one memory block in response to a decoded address. During the erase operation, the row decoder 121 may apply a ground voltage to word lines coupled to the selected memory block.

The voltage generator 122 may operate under the control of the control logic 130. The voltage generator 122 may generate a plurality of voltages using an external supply voltage supplied to the memory device 100. In detail, the voltage generator 122 may generate various operating voltages Vop to be used for a program operation, a read operation, and an erase operation in response to an operating signal OPSIG. For example, the voltage generator 122 may generate a program voltage, a verify voltage, a pass voltage, a read voltage, an erase voltage, and so forth under the control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using an external power supply voltage or an internal power supply voltage.

For example, the voltage generator 122 may include a plurality of pumping capacitors for receiving the internal supply voltage and generate a plurality of voltages by selectively activating the plurality of pumping capacitors under the control of the control logic 130.

The generated voltages may be supplied to the memory cell array 110 by the row decoder 121.

The page buffer group 123 may include first to n-th page buffers PB1 to PBn. The first to n-th page buffers PB1 to PBn are coupled to the memory cell array 110 through the first to n-th bit lines BL1 to BLn, respectively. The first to n-th page buffers PB1 to PBn may operate under the control of the control logic 130. The first to n-th page buffers PB1 to PBn may operate in response to page buffer control signals PBSIGNALS. For instance, the first to n-th page buffers PB1 to PBn may temporarily store data received through the first to n-th bit lines BL1 to BLn, or sense voltages or currents of the first to n-th bit lines BL1 to BLn during a read operation or a verify operation.

During a program operation, the first to n-th page buffers PB1 to PBn may transmit data DATA received through the data input/output circuit 125 to selected memory cells through the first to n-th bit lines BL1 to BLn when a program pulse is applied to a selected word line. The memory cells in the selected page are programmed based on the transmitted data. A memory cell coupled to a bit line to which a program enable voltage (e.g. a ground voltage) is applied may have an increased threshold voltage. The threshold voltage of a memory cell coupled to a bit line to which a program inhibit voltage (for example, a supply voltage) is applied may be retained. During a program verify operation, the first to n-th page buffers PB1 to PBn may read page data from selected memory cells through the first to n-th bit lines BL1 to BLn.

During a read operation, the first to n-th page buffers PB1 to PBn may read data DATA from memory cells of a selected page through the first to n-th bit lines BL1 to BLn, and output the read data DATA to the data input/output circuit 125 under the control of the column decoder 124.

During an erase operation, the first to n-th page buffers PB1 to PBn may float the first to n-th bit lines BL1 to BLn.

The column decoder 124 may transmit data between the input/output circuit 125 and the page buffer group 123 in response to a column address CADD. For example, the column decoder 124 may exchange data with the first to n-th page buffers PB1 to PBn through data lines DL or exchange data with the input/output circuit 125 through column lines CL.

The input/output circuit 125 may transmit, to the control logic 130, a command CMD or an address ADDR received from the memory controller 200 described with reference to FIG. 1, or may exchange data DATA with the column decoder 124.

During a read operation or a verify operation, the sensing circuit 126 may generate a reference current in response to an enable bit signal VRYBIT, compare a sensing voltage VPB received from the page buffer group 123 with a reference voltage generated by the reference current, and output a pass signal PASS or a fail signal FAIL.

The control logic 130 may output an operating signal OPSIG, a row address RADD, page buffer control signals PBSIGNALS, and an enable bit signal VRYBIT in response to a command CMD and an address ADD, and thus control the peripheral circuit 120. In addition, the control logic 130 may determine whether a target memory cell has passed a verification during a verify operation in response to a pass signal PASS or a fail signal FAIL.

Figure 3:
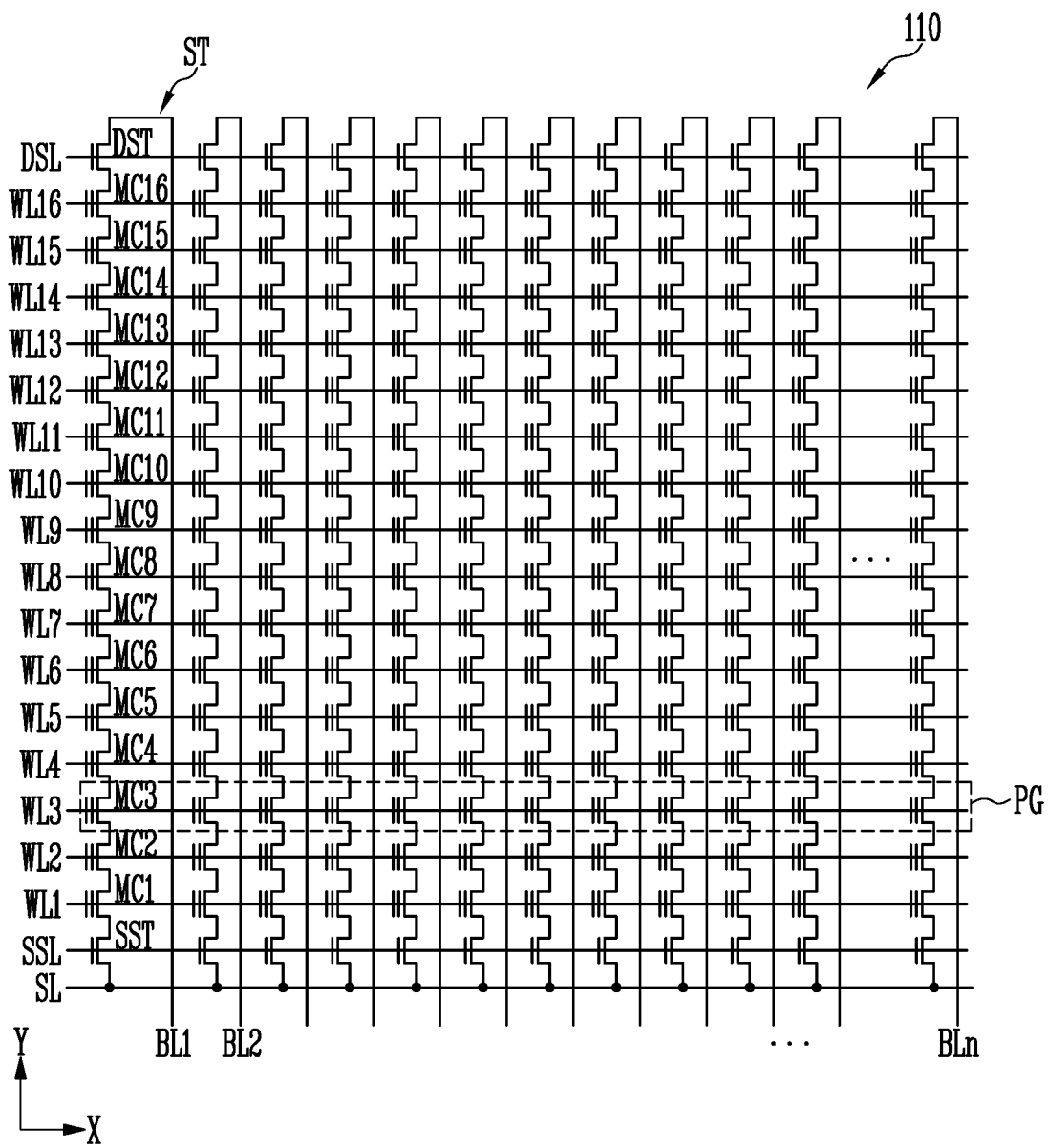
FIG. 3 is a diagram illustrating a structure of any one memory block BLKn of a plurality of memory blocks BLK1 to BLKz of FIG. 2 according to an embodiment of the present disclosure.

FIG. 3 is a diagram illustrating a structure of any one memory block BLKn of a plurality of memory blocks BLK1 to BLKz of FIG. 2 according to an embodiment of the disclosure.

Referring to FIG. 3, in the memory block BLKn, a plurality of word lines arranged parallel to each other may be coupled between a first select line and a second select line. Here, the first select line may be a source select line SSL, and the second select line may be a drain select line DSL. In more detail, the memory block BLKn may include a plurality of strings ST coupled between the bit lines BL1 to BLn and the source line SL. The bit lines BL1 to BLn of FIG. 3 may be first to n-th bit lines BL1 to BLn of FIG. 2. The bit lines BL1 to BLn may be respectively coupled to the strings ST, and the source lines SL may be coupled in common to the strings ST. The strings ST may have the same configuration; therefore, the string ST that is coupled to the first bit line BL1 will be described in detail as an example.

The string ST may include a source select transistor SST, a plurality of memory cells MC1 to MC16, and a drain select transistor DST which are coupled in series to each other between the source line SL and the first bit line BL1. At least one source select transistor SST and at least one drain select transistor DST may be included in each string ST. The number of memory cells MC1 to MC16 shown in FIG. 3 are not limited, and other embodiments with a larger number of memory cells included in each string ST are contemplated by the disclosure.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells MC1 to MC16 may be coupled respectively to a plurality of word lines WL1 to WL16. Among the memory cells included in different strings ST, a group of memory cells coupled to each word line may be referred to as a physical page PG. Therefore, the number of physical pages PG included in the memory block BLKn may correspond to the number of word lines WL1 to WL16. The source line SL, the source select line SSL, the word lines WL1 to WL16, and the drain select line DSL that are shown in FIG. 3 may be included in the row lines RL of FIG. 2. The drain select line DSL, the first to sixteenth word lines WL1 to WL16, and the source select line SSL are controlled by the row decoder 121. The source line SL is controlled by the control logic 130.

If a memory cell is a single-level cell (SLC) capable of storing one bit of data, then corresponding physical page PG may store one logical page (LPG) of data. Each memory cell may store two or more bits of data, and in such a case, each physical page PG may store two or more LPGs of data.

Figure 4:
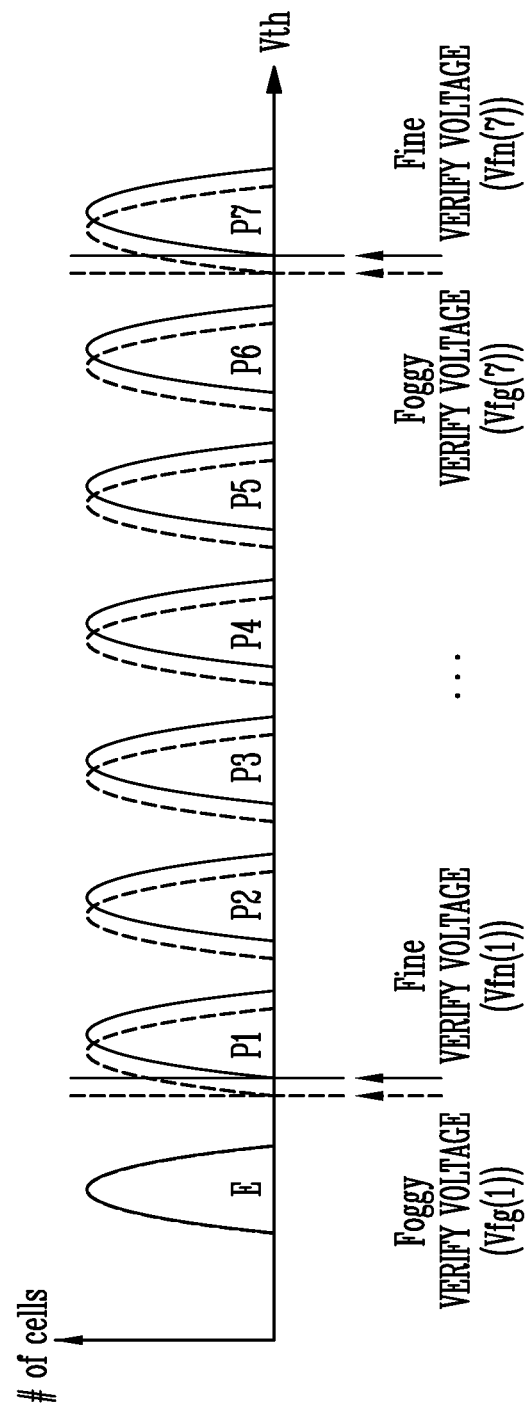
FIG. 4 is a diagram illustrating foggy-fine program operations that may be used in methods of storing data in a memory device in accordance with an embodiment of the present disclosure.

FIG. 4 is a diagram illustrating foggy-fine program operations that may be used in methods of storing data in a memory device in accordance with an embodiment of the present disclosure. The horizontal axis of FIG. 4 represents the threshold voltage of the memory cell, and the vertical axis of FIG. 4 represents the number of memory cells.

A triple-level cell TLC capable of storing three bits of data in one memory cell will be described as a representative example. Each of the memory cells may have an erased status E or any one of first to seventh programmed states P1 to P7 as a target programmed state. The target programmed state may be determined depending on data to be stored in the memory cell.

FIG. 4 illustrates threshold voltage distributions Vth relative to the number of bits of data stored in a memory cell. FIG. 4 includes a threshold voltage distribution when a foggy program operation is performed, and a threshold voltage distribution when a fine program operation is performed. The foggy program operation may include a foggy program voltage applying operation and a foggy verify operation. The fine program operation may include a fine program voltage applying operation and a fine verify operation. A foggy verify voltage Vfg to be used during the foggy program operation may be lower than a fine verify voltage Vfn to be used during the fine program operation. The fine verify voltage Vfn may be the same as a verify voltage corresponding to an associated target program state.

FIG. 5 is a diagram illustrating a sequence in which a foggy-fine program operation is performed in a memory block in accordance with an embodiment of the present disclosure.

Referring to FIG. 5, a foggy program operation and a fine program operation may be performed on each of a plurality of word lines. The program operations may be performed in a direction in which word line number is increased. In an embodiment, the foggy program operation and the fine program operation may be separately performed. For example, if a foggy program operation on WL1 is completed, then a foggy program operation may be performed on an adjacent word line WL2. If the foggy program operation on WL2 is completed, then a fine program operation may be performed on WL1. If the fine program operation on WL1 is completed, then a foggy program operation may be performed on WL3. If the foggy program operation on WL3 is completed, then a fine program operation may be performed on WL2. In other words, a fine program operation is performed on an N-th word line WL N, and thereafter, if the fine program operation is completed on WL N, then a foggy program operation may be performed on WL N+2. If the foggy program operation on WL N+2 is completed, then a fine program operation may be performed on WL N+1. If the fine program operation on WL N+1 is completed, then a foggy program operation may be performed on WL N+3. If the foggy program operation on WL N+3 is completed, then a fine program operation may be performed on WL N+2. In this way, a foggy-fine program operation may be performed on a plurality of word lines in the memory cell array 110 alternatively.

If a sudden power off event occurs after a foggy program for data to be stored in WL N+2 is performed and before a fine program is performed, then the data to be stored in WL N+2 may be lost. Therefore, there is need for a memory device to store, for backup, the data to be stored in WL N+2 so as to cope with a sudden power off event.

In this situation, because the same data is stored in different memory blocks, different random seeds may be used. In accordance with an embodiment of the present disclosure, if the same data is stored in different memory blocks, then the randomizer 210 may perform a randomization operation using the same random seed. Therefore, the efficiency of the foggy-fine program operation may be enhanced.

Figure 6:
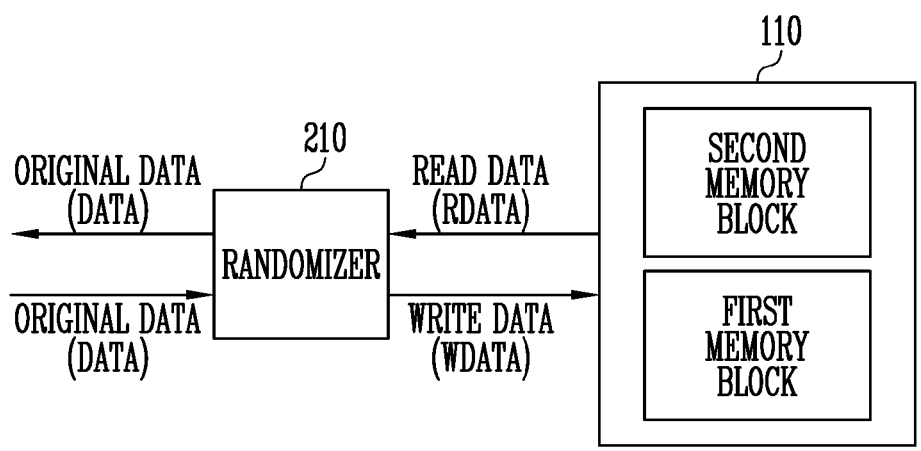
FIG. 6 is a diagram illustrating a process of writing identical data to a plurality of memory bocks BLK1 to BLK2 or reading identical data therefrom in accordance with embodiments of the present disclosure.

FIG. 6 is a diagram illustrating a process of writing identical data to a plurality of memory bocks BLK1 to BLK2 or reading identical data therefrom in accordance with embodiments of the present disclosure.

Original data DATA may be input to the randomizer 210 included in the memory controller 200 in response to a write request of the host 300. The input original data DATA may be converted into write data WDATA through a randomization operation. The randomization operation may include various methods of generating converted data by combining the original data with a random seed SEED. The write data WDATA may be stored in at least one memory block of a first memory block BLK1 and a second memory block BLK2. The write data WDATA stored in the first memory block BLK1 may be the same data as the write data WDATA stored in the second memory block BLK2.

Read data RDATA may be output from the memory cell array 110. The memory cell array 110 may include a plurality of memory blocks BLK1 to BLKz. For example, the plurality of memory blocks BLK1 to BLKz may include the first memory block BLK1 and the second memory block BLK2. The read data RDATA may be read and output from any one of the first memory block BLK1 and the second memory block BLK2. The output read data RDATA may be input to the randomizer 210. The input read data RDATA may be converted into original data DATA through a de-randomization operation. The de-randomization operation may include various methods of generating original data by combining the converted data with a random seed SEED.

Figure 7:
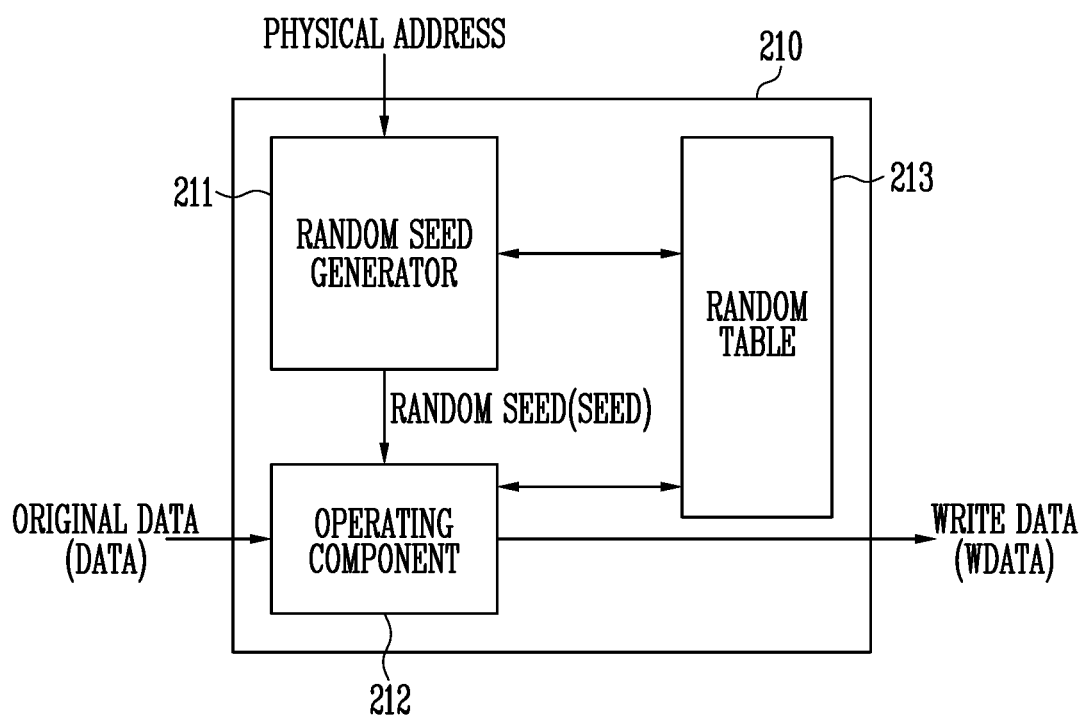
FIG. 7 is a diagram illustrating a method of operating a randomizer 210 during a write operation in accordance with an embodiment of the present disclosure.

FIG. 7 is a diagram illustrating a method of operating the randomizer 210 during a write operation in accordance with an embodiment of the present disclosure.

Referring to FIG. 7, the randomizer 210 may include a random seed generator 211, an operating component 212, and a random table 213. A physical address obtained from the memory controller 200 may be at least one of a first physical address indicating addresses of memory cells included in the first memory block BLK1 and a second physical address indicating addresses of memory cells included in the second memory block BLK2. A converted physical address may be input to the random seed generator 211. The random seed generator 211 may obtain a random seed SEED with reference to the random table 213 and output the random seed SEED to the operating component 212. The operating component 212 may perform a randomization operation using received original data DATA and the received random seed SEED. As a result of performing the randomization operation, write data WDATA may be generated. The write data WDATA may be output from the randomizer 210. The write data WDATA may be stored in at least one of the plurality of memory blocks BLK1 to BLKz included in the memory cell array 110.

In an embodiment of the present disclosure, when both the first physical address and the second physical address are input, the random seed generator 211 may select either physical address. For example, the selected physical address may be the second physical address. The random seed generator 211 may obtain a random seed SEED corresponding to the selected physical address with reference to the random table 213 and output the random seed SEED to the operating component 212. The operating component 212 may perform a randomization operation using received original data DATA and the received random seed SEED. As a result of performing the randomization operation, write data WDATA may be generated. The write data WDATA may be output from the randomizer 210. The write data WDATA may be stored in the plurality of memory blocks BLK1 to BLKz included in the memory cell array 110 corresponding to the second physical address.

Figure 8:
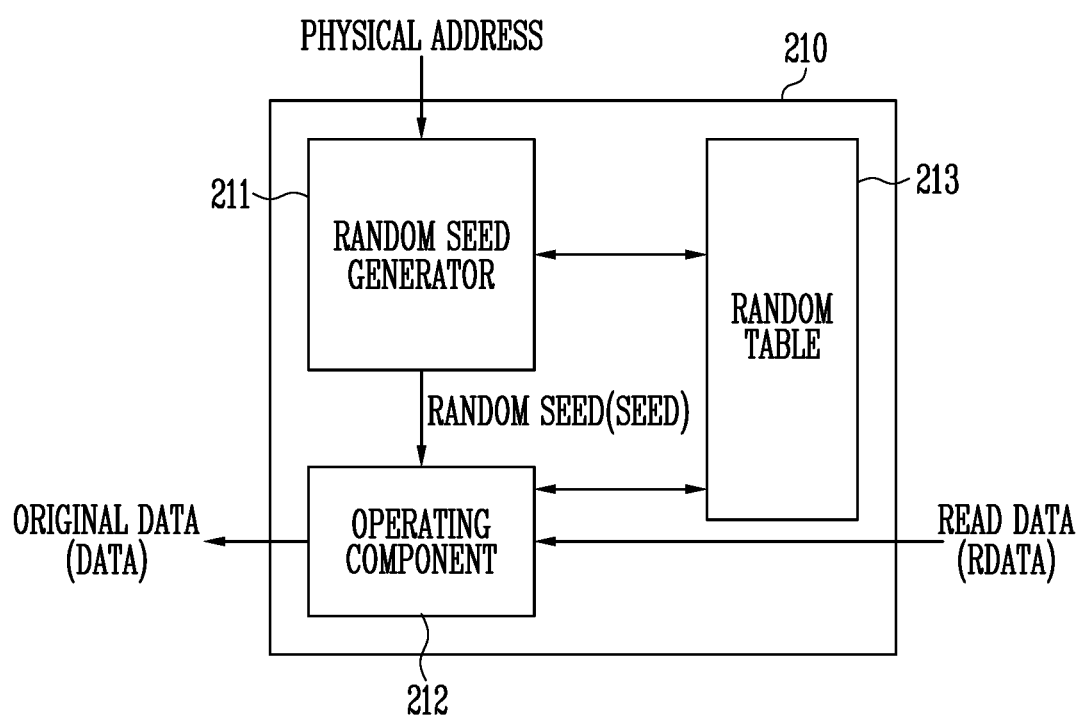
FIG. 8 is a diagram illustrating a method of operating a randomizer 210 during a read operation in accordance with an embodiment of the present disclosure.

FIG. 8 is a diagram illustrating a method of operating a randomizer 210 during a read operation in accordance with an embodiment of the present disclosure.

Referring to FIG. 8, the randomizer 210 may include a random seed generator 211, an operating component 212, and a random table 213. The memory controller 200 may receive read data RDATA and a physical address in response to a read request from the host. The received physical address may be input to the random seed generator 211. The random seed generator 211 may obtain a random seed SEED with reference to the random table 213 and output the random seed SEED to the operating component 212. The operating component 212 may perform a de-randomization operation using the received read data RDATA and the received random seed SEED. As a result of performing the de-randomization operation, original data DATA may be generated. The original data DATA may be output from the randomizer 210. The output data may be provided to the host.

Figure 9:
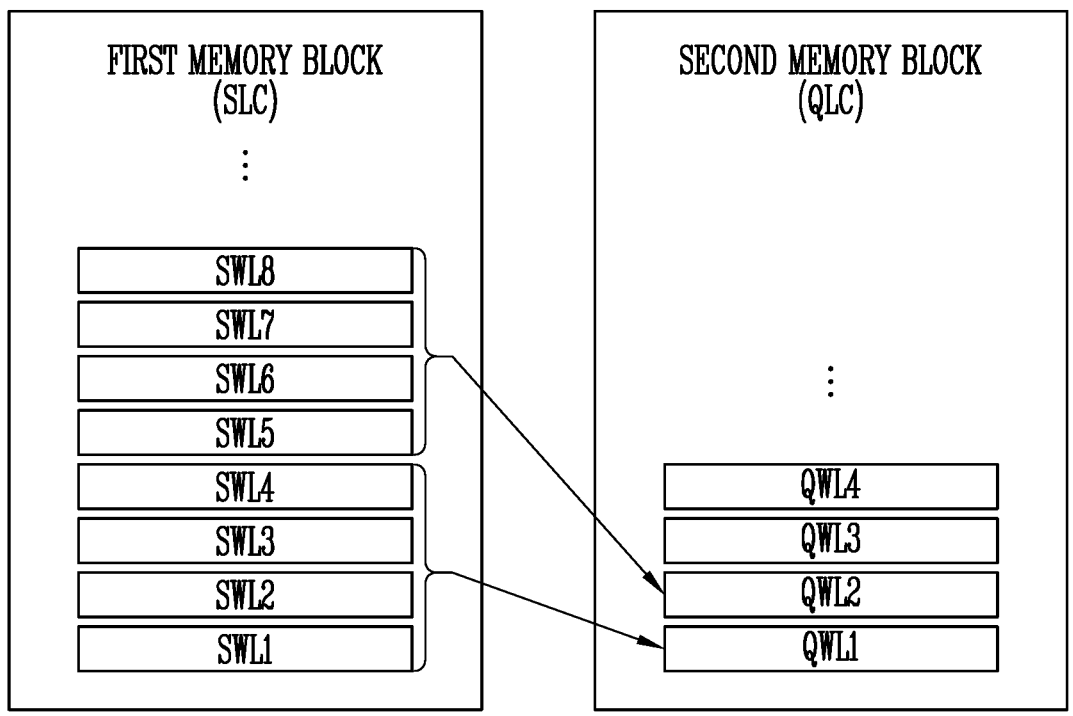
FIG. 9 is a diagram illustrating a relationship between physical addresses in a plurality of memory blocks BLK1 to BLKz in accordance with an embodiment of the present disclosure.

FIG. 9 is a diagram illustrating a relationship between physical addresses of a plurality of memory blocks BLK1 to BLKz in accordance with an embodiment of the present disclosure.

The same data may be stored in the plurality of memory blocks BLK1 to BLKz in response to a write request from the host. For example, it is assumed that the same data is stored in a first memory block SLC formed of SLC memory cells and a second memory block QLC formed of QLC memory cells. The first memory block may include a plurality of pages, and each page may include a plurality of memory cells. Data may be stored in each of the memory cells. The second memory block may include a plurality of pages, and each page may include a plurality of memory cells. Data may be stored in each of the memory cells.

Referring to FIG. 9, physical addresses indicating positions at which data is stored in the first memory block may be designated by SWL1, SWL2, SWL3, SWL4, etc. Physical addresses indicating positions at which data is stored in the second memory block may be designated by QWL1, QWL2, QWL3, QWL4, etc. Each memory cell included in the first memory block may store one data bit, and each memory cell included in the second memory block may store four data bits. Therefore, when it is assumed that the same data is stored in the first memory block formed of SLC memory cells and the second memory block formed of QLC memory cells, the data stored in four SLC memory blocks may be the same as the data stored in one QLC memory block. In other words, four physical addresses of the first memory block may correspond to one physical address of the second memory block. For example, data included memory cells having physical addresses SWL1, SWL2, SWL3, and SWL4 may be the same as data included in memory cells having a physical address QWL1. As another example, data included memory cells having physical addresses SWL5, SWL6, SWL7, and SWL8 may be the same as data included in memory cells having a physical address QWL2.

FIG. 10 is a diagram illustrating a random table 213 in accordance with an embodiment of the present disclosure.

The random table 213 may include SLC addresses indicating physical addresses of memory cells included in the first memory block, and QLC addresses indicating physical addresses of memory cells included in the second memory block. Furthermore, the random table 213 may include random seeds SEED corresponding to the respective QLC addresses. Although for the sake of explanation there is illustrated an example where the random table includes eight SLC addresses, those skilled in the art will understand that the number of physical addresses included in the random table 213 may be increased.

As described in FIG. 9, four SLC physical addresses may correspond to one QLC physical address. One random seed SEED may correspond to one QLC physical address. For example, SWL1, SWL2, SWL3, and SWL4 among the SLC physical addresses may correspond to QWL1 among the QLC physical addresses. SQW1, which is a random seed SEED corresponding to QWL1, may be obtained. In another example, SWL5, SWL6, SWL7, and SWL8 among the SLC physical addresses may correspond to QWL2 among the QLC physical addresses. SQW2, a random seed SEED corresponding to QWL2, may be obtained.

If a physical address to be input to the random seed generator 211 is SWL1, then the random seed generator 211 may obtain QWL1, which corresponds to a QLC physical address, by referencing random table 213, and may obtain SQW1, which is a random seed SEED corresponding to the QWL1. If a physical address to be input to the random seed generator 211 is SWL2, then the random seed generator 211 may obtain QWL1, corresponding to a QLC physical address with reference to the random table 213, and may obtain SQW1, a random seed SEED corresponding to the QWL1. If a physical address to be input to the random seed generator 211 is SWL3, then the random seed generator 211 may obtain QWL1, which is a corresponding QLC physical address with reference to the random table 213, and may obtain SQW1, which is a random seed SEED corresponding to the QWL1. If a physical address to be input to the random seed generator 211 is SWL4, then the random seed generator 211 may obtain QWL1 corresponding to a QLC physical address by reference to the random table 213, and may obtain SQW1, which is a random seed SEED corresponding to the QWL1.

If a physical address to be input to the random seed generator 211 is SWL5, then the random seed generator 211 may obtain QWL2, which is a corresponding QLC physical address, with reference to the random table 213, and may obtain SQW2, which is a random seed SEED corresponding to the QWL2. If a physical address to be input to the random seed generator 211 is SWL6, then the random seed generator 211 may obtain QWL2, corresponding to a QLC physical address, with reference to the random table 213, and may obtain SQW2, which is a random seed SEED corresponding to the QWL2. If a physical address to be input to the random seed generator 211 is SWL7, then the random seed generator 211 may obtain QWL2, corresponding to a QLC physical address, with reference to the random table 213, and may obtain SQW2, a random seed SEED corresponding to the QWL2. If a physical address to be input to the random seed generator 211 is SWL8, then the random seed generator 211 may obtain QWL2, which is a corresponding QLC physical address, with reference to the random table 213, and may obtain SQW2, which is a random seed SEED corresponding to the QWL2.

An obtained random seed SEED may be input to an operating component and used in a randomization operation.

Figure 11:
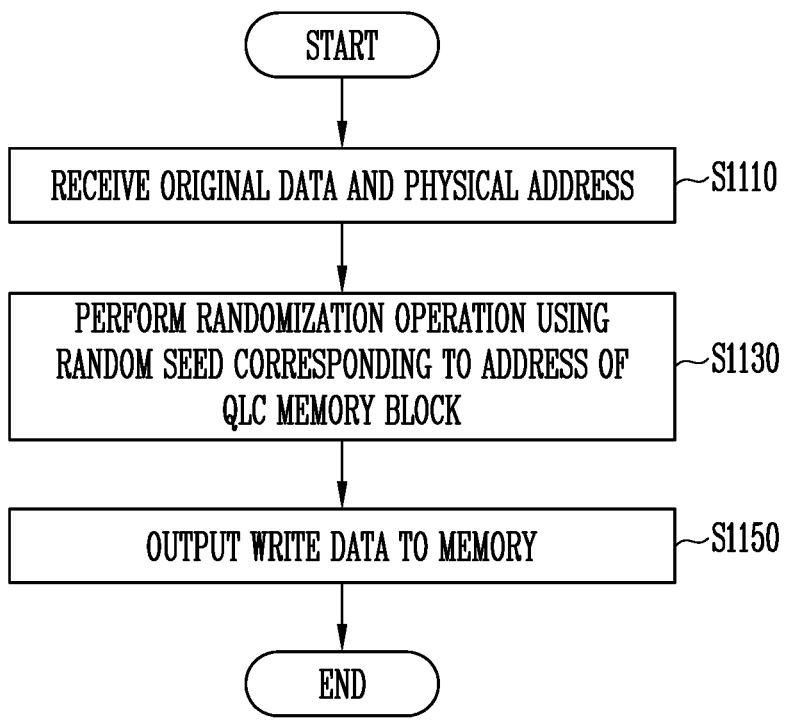
FIG. 11 is a flowchart illustrating a method of performing an operation of generating and outputting write data using a randomizer when a write request is received form a host in accordance with an embodiment of the present disclosure.

FIG. 11 is a flowchart illustrating in detail a method of performing an operation of generating and outputting write data using the randomizer 210 when a write request is received form the host in accordance with an embodiment of the present disclosure.

At step S1110, the memory controller 200 may receive original data DATA and a physical address. The physical address may be at least one of the first physical address and the second physical address. The first physical address may be an address indicating memory cells included in a first memory block. The second physical address may be an address indicating memory cells included in a second memory block.

At step S1130, the original data DATA and the physical address may be an input to the randomizer 210. If the input physical address is an address indicating memory cells included in an SLC block, then the randomizer 210 may check the address of a corresponding QLC memory block, and perform a randomization operation using a random seed SEED corresponding to the address of the QLC memory block. If the input physical address is an address indicating memory cells included in a QLC block, then the randomizer 210 may perform a randomization operation using a random seed SEED corresponding to the address of the QLC memory block.

At step S1150, write data WDATA generated as a result of performing the randomization operation may be output to the memory device 100. The memory device 100 may receive the write data WDATA and store the write data WDATA in memory cells corresponding to the input physical address.

Figure 12:
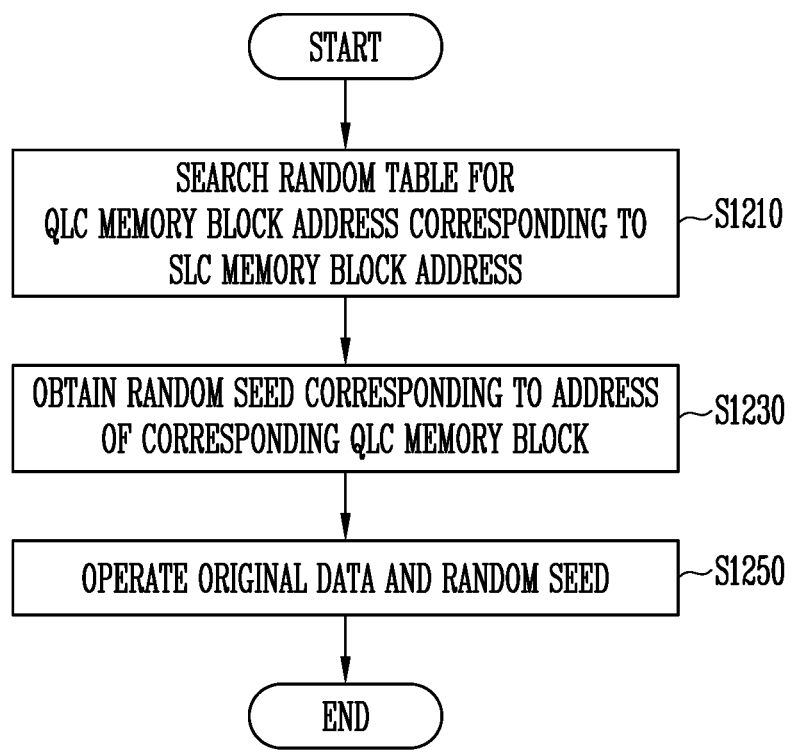
FIG. 12 is a flowchart illustrating a method of obtaining a random seed of FIG. 11 and performing a randomization operation in accordance with an embodiment of the present disclosure.

FIG. 12 is a flowchart illustrating a method of obtaining a random seed of FIG. 11 and performing a randomization operation in accordance with an embodiment of the present disclosure.

Referring to FIG. 12, at step S1210, original data DATA and a physical address may be input to the randomizer 210 included in the memory controller 200. The physical address may be input to the random seed generator 211 included in the randomizer 210. When the input physical address is an address indicating memory cells included in an SLC memory block, the random seed generator 211 may check the address of a QLC memory block corresponding to the address of the SLC memory block with reference to a random table 213.

At step S1230, a random seed SEED corresponding to the address of the QLC memory block checked at step S1210 may be obtained.

At step S1250, the obtained random seed SEED and the original data DATA are input to an operating component 212. The operating component 212 may perform a randomization operation using the obtained random seed SEED and the original data DATA.

Figure 13:
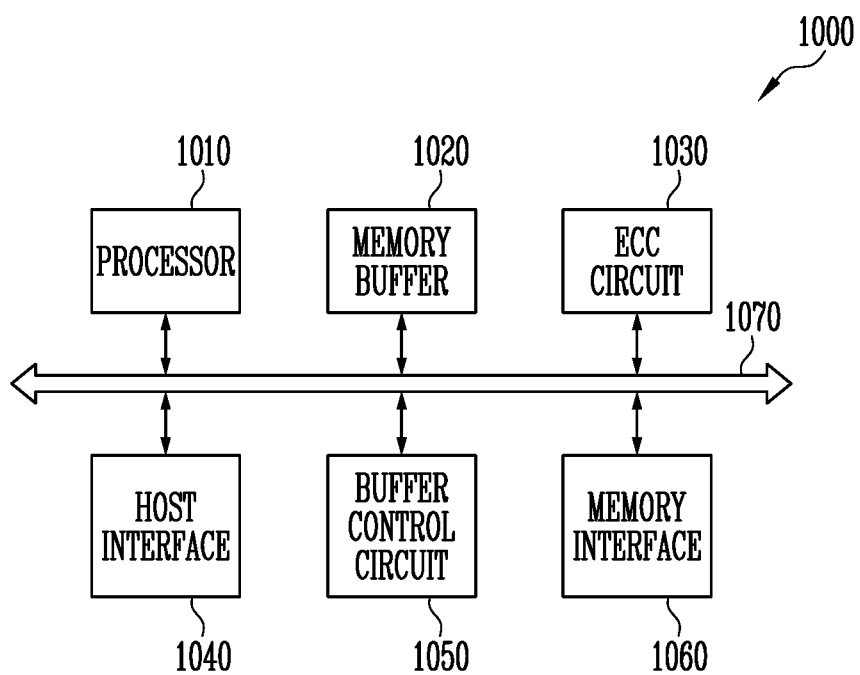
FIG. 13 is a diagram illustrating an embodiment of a memory controller of FIG. 1 according to an embodiment of the present disclosure.

FIG. 13 is a diagram illustrating an embodiment of a memory controller of FIG. 1 according to an embodiment of the disclosure.

A memory controller 1000 is coupled to a host and a memory device. In response to a request from the host, the memory controller 1000 may access the memory device.

Referring to FIG. 13, the memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may randomize data received from the host. For example, the processor 1010 may use a random seed to randomize data received from the host. Randomized data may be provided to the memory device as data to be stored, and may be programmed to the memory cell array.

The processor 1010 may de-randomize data received from the memory device during a read operation. For example, the processor 1010 may use a random seed to de-randomize data received from the memory device. De-randomized data may be output to the host.

In an embodiment, the processor 1010 may drive software or firmware to perform a randomization operation or a de-randomization operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods by way of non-limiting examples.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

For example, the memory controller 1000 does include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
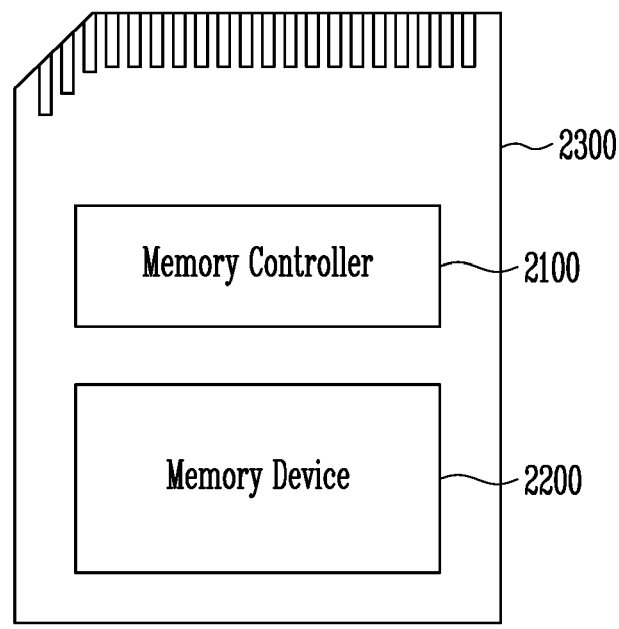
FIG. 14 is a block diagram illustrating a memory card system using a storage device including a memory device in accordance with an embodiment of the present disclosure.

FIG. 14 is a block diagram illustrating a memory card system 2000 to which a storage device including a memory device in accordance with an embodiment of the present disclosure is applied.

Referring FIG. 14, the memory card system 2000 may include a memory controller 2100, a memory device 2200 and a connector 2300.

The memory controller 2100 is coupled to the memory device 2200. The memory controller 2100 may access the memory device 2200. The memory controller 2100 may be embodied in the same manner as that of the memory controller 200 described with reference to FIG. 1.

In an embodiment, the memory controller 2100 may include components such as a random access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols by way of non-limiting examples. In an embodiment, the connector 2300 may be defined by at least one of the above-described various communication protocols.

In an embodiment, the memory device 2200 may be implemented as any of various nonvolatile memory devices, such as for example an electrically erasable and programmable ROM (EEPROM), a NAND flash memory, a NOR flash memory, a phase-change RAM (PRAM), a resistive RAM (ReRAM), a ferroelectric RAM (FRAM), or a spin-torque magnetic RAM (STT-MRAM).

For example, the memory controller 2100 or the memory device 2200 may be packaged as a Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP). Alternatively, the memory device 2200 may include a plurality of nonvolatile memory chips, and the plurality of nonvolatile memory chips may be packaged based on the above-mentioned package methods and provided as a single semiconductor package.

For example, the memory controller 2100 and the memory device 2200 may be integrated into a single semiconductor device. For example, the memory controller 2100 and the memory device 2200 may be integrated into a single semiconductor device to form a solid state drive (SSD). In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

For example, the memory device 2200 may be a memory device 100 described with reference to FIG. 2.

Figure 15:
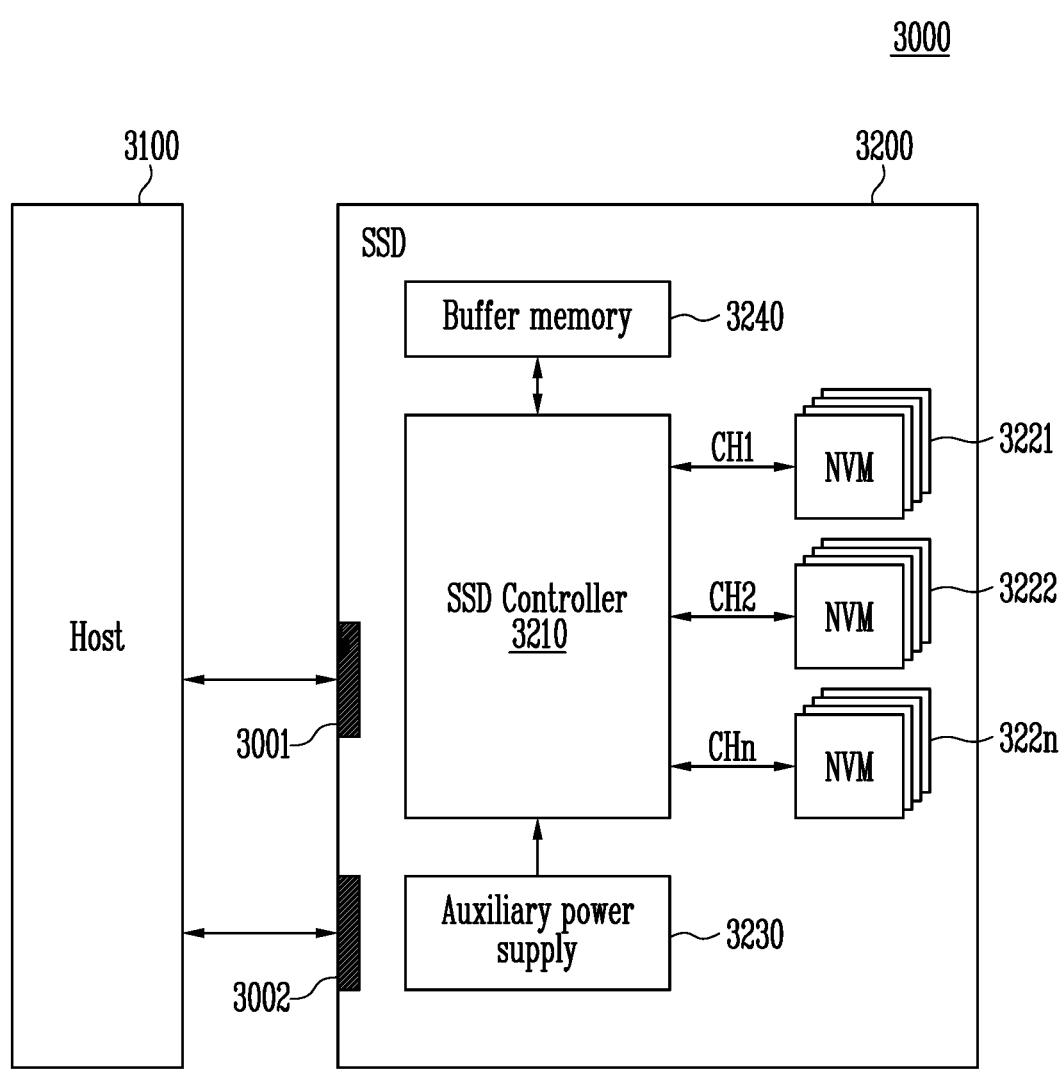
FIG. 15 is a block diagram illustrating a solid state drive (SSD) system using a storage device including a memory device in accordance with an embodiment of the present disclosure.

FIG. 15 is a block diagram illustrating a solid state drive (SSD) system 3000 to which a storage device including a memory device in accordance with an embodiment of the present disclosure is applied.

Referring to FIG. 15, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322$n$ in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, or nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$ or may temporarily store metadata (e.g., a mapping table) of the flash memories 3221 to 322$n$. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM for example.

For example, each of the nonvolatile memory devices 3221 to 322$n$ may be the memory device 100 described with reference to FIG. 2.

Figure 16:
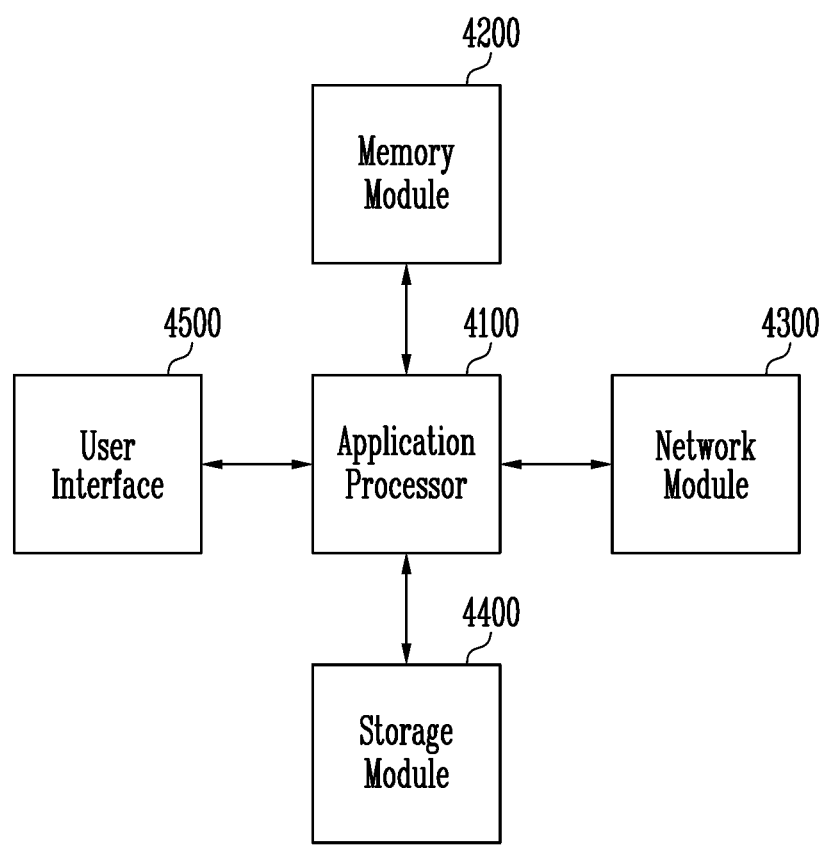
FIG. 16 is a block diagram illustrating a user system using a storage device including a memory device in accordance with an embodiment of the present disclosure.

FIG. 16 is a block diagram illustrating a user system to which a storage device including a memory device in accordance with an embodiment of the present disclosure is applied.

Referring to FIG. 16, the user system 4000 may include an application processor 4100, a memory module 4200, a network module 4300, a storage module 4400, and a user interface 4500.

The application processor 4100 may run components included in the user system 4000, an operating system (OS)

or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may, for example, be a memory device 100 described above with reference to FIG. 2.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a motor.

Various embodiments of the present disclosure may provide a memory device having enhanced reliability, and a method of operating the memory device.

While the exemplary embodiments of the present disclosure have been disclosed for illustrative purposes, those skilled in the art will appreciate that various modifications, additions and substitutions are possible without departing from the scope and spirit of the present disclosure. The scope of the present disclosure may therefore be defined by the appended claims and equivalents of the claims rather than by the descriptions preceding them.

In the above-discussed embodiments, any given step may be selectively performed or skipped. In addition, the steps in each embodiment need not be always performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller configured to control an operation of a memory device including a first memory block and a second memory block, comprising:
   a random table configured to include a first address group including physical page addresses of the first memory block and a second address group including physical page addresses of the second memory block, and a random seed group including random seeds corresponding to the first address group and the second address group;
   a random seed generator configured to output a selected random seed from among the random seeds included in the random seed group, based on a physical page address of write data among the physical page addresses of the first address group and the second address group; and
   an operating component configured to generate the write data by randomizing, using the selected random seed and original data,
   wherein at least two physical page addresses of the first address group correspond to one physical page address of the second address group, and
   wherein the at least two physical page addresses of the first address group and the one physical page address of the second address group corresponding to the at least two physical page addresses of the first address group have a same random seed among the random seeds.

2. The controller according to claim 1, wherein each of memory cells included in the first memory block is a single-level cell, and each of memory cells included in the second memory block is a quad-level cell.

3. The controller according to claim 1, wherein the write data is data obtained by randomizing the original data using the selected random seed.

4. The controller according to claim 1, wherein the number of data bits stored in each memory cell included in the first memory block is smaller than the number of data bits stored in each memory cell included in the second memory block.

5. The controller according to claim 1, wherein each memory cell included in the second memory block is programmed in foggy-fine program operation.

6. A storage device comprising:
   a memory device including a first memory block and a second memory block; and
   a controller configured to:

determine a random seed corresponding to an address of write data based on a random table comprising correspondence information among a plurality of page addresses of the first memory block, a plurality of page addresses of the second memory block and a plurality of random seeds, generate random data by randomizing the write data using the random seed, and control the memory device to store the random data in a page of a selected memory block corresponding to the address of the write data, wherein page addresses, among the plurality of page addresses of the first memory block, correspond to a page address among the plurality of page addresses of the second memory block, and correspond to the random seed among the plurality of random seeds.

7. The storage device according to claim 6, wherein each memory cell included in the first memory block is programmed to store 1 bit, and each memory cell included in the second memory block is programmed to store 4 bits.

8. The storage device according to claim 6, wherein the number of data bits stored in each memory cell included in the first memory block is smaller than the number of data bits stored in each memory cell included in the second memory block.

9. The storage device according to claim 6, wherein each memory cell included in the second memory block is programmed in foggy-fine program operation.

10. A storage device comprising:
a memory device including a first memory block and a second memory block, wherein each of the first memory block and the second memory block comprises a plurality of pages that are coupled to a plurality of word lines, respectively; and
a memory controller configured to:
determine a random seed corresponding to a page address indicating a page of the first memory block or the second memory block from among a plurality of random seeds, and
generate random data to be stored in the page of the first memory block or the second memory block and indicating the page address using write data and the random seed, wherein each of the plurality of random seeds corresponds to a plurality of page addresses of the first memory block and corresponds to one page address of the second memory block.

11. The storage device according to claim 10, wherein the first memory block includes memory cells programmed to store 1 bit, and the second memory block includes memory cells programmed to store 2 bits or more.

12. The storage device according to claim 11, wherein the memory controller comprises:
a random table configured to include a first address group including addresses of memory cells included in the first memory block, a second address group including addresses of memory cells that are included in the second memory block and correspond to the respective addresses of the memory cells included in the first memory block, and a random seed group including random seeds corresponding to the respective addresses of the memory cells included in the second memory block;
a random seed generator configured to output a selected random seed from among the random seeds included in the random seed group, based on an address in which the random data is to be stored among the addresses included in the first address group or the second address group; and
an operating component configured to generate the random data by randomizing, using the selected random seed and original data.

13. The storage device according to claim 12, wherein the random data is stored in the first memory block or the second memory block.

14. The storage device according to claim 12, wherein the number of data bits stored in each memory cell included in the first memory block is smaller than the number of data bits stored in each memory cell included in the second memory block.

15. The storage device according to claim 12, wherein each memory cell included in the second memory block is programmed in foggy-fine program operation.

* * * * *